United States Patent
Nguyen et al.

(10) Patent No.: US 10,060,781 B2
(45) Date of Patent: Aug. 28, 2018

(54) METHODS AND SYSTEMS FOR DIRECT FUEL QUANTITY MEASUREMENT

(71) Applicant: The Boeing Company, Chicago, IL (US)

(72) Inventors: Sang H. Nguyen, Placentia, CA (US); David W. Kwok, La Mirada, CA (US); David M. Smith, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 14/818,701

(22) Filed: Aug. 5, 2015

(65) Prior Publication Data
US 2017/0038238 A1 Feb. 9, 2017

(51) Int. Cl.
| | | |
|---|---|---|
| *G01F 9/00* | (2006.01) | |
| *G01F 23/00* | (2006.01) | |
| *G01F 22/00* | (2006.01) | |
| *G01F 22/02* | (2006.01) | |
| *G01F 23/14* | (2006.01) | |

(52) U.S. Cl.
CPC ............ *G01F 23/0076* (2013.01); *G01F 9/00* (2013.01); *G01F 22/00* (2013.01); *G01F 22/02* (2013.01); *G01F 23/14* (2013.01)

(58) Field of Classification Search
CPC ........ G01F 23/0076; G01F 23/14; G01F 9/00; G01F 9/008; G01F 9/001; G01F 22/00; G01F 22/02; G01M 15/042; G01M 13/00
USPC ................. 73/114.54, 114.52, 114.01, 114.57
See application file for complete search history.

(56) References Cited

U.S. PATENT DOCUMENTS

| | | |
|---|---|---|
| 4,553,431 A | 11/1985 | Nicolai |
| 4,840,064 A | 6/1989 | Fudim |

(Continued)

FOREIGN PATENT DOCUMENTS

| | | | | |
|---|---|---|---|---|
| EP | 2772436 | * | 9/2014 | ............ B64D 37/32 |
| EP | 2772436 A2 | | 9/2014 | |

(Continued)

OTHER PUBLICATIONS

Extended European Search Report dated Nov. 24, 2016 in European Application No. 16177459.1 (European counterpart of the instant application).

(Continued)

*Primary Examiner* — Manish S Shah
*Assistant Examiner* — Nigel Plumb
(74) *Attorney, Agent, or Firm* — Ostrager Chong Flaherty & Broitman P.C.

(57) ABSTRACT

A method for fuel quantity gauging that measures the quantity of liquid fuel in a fuel tank. The method includes the following steps performed while fuel is flowing out of the fuel tank: changing a volume of gas in the fuel tank (e.g., by injecting or venting gas) during a time interval; measuring a rate of change of the volume of gas in the fuel tank during the time interval; measuring a rate of flow of fuel out of the fuel tank during the time interval; measuring a first pressure and a first temperature of the gas in the fuel tank at the start of the time interval; measuring a second pressure and a second temperature of the gas in the fuel tank at the end of the time interval; and calculating a quantity of fuel in the fuel tank based on the acquired measurement data.

23 Claims, 5 Drawing Sheets

(56) References Cited

U.S. PATENT DOCUMENTS

| | | | |
|---|---|---|---|
| 7,152,635 B2* | 12/2006 | Moravec | B64D 37/32 |
| | | | 141/64 |
| 7,815,148 B2* | 10/2010 | Kwok | A62C 99/0018 |
| | | | 244/135 R |
| 2012/0234074 A1* | 9/2012 | Hagen | G01F 1/32 |
| | | | 73/1.73 |
| 2015/0075267 A1* | 3/2015 | Sweppy | G01M 3/3272 |
| | | | 73/114.43 |
| 2015/0192450 A1* | 7/2015 | Leone | G01F 23/14 |
| | | | 701/36 |

FOREIGN PATENT DOCUMENTS

| | | |
|---|---|---|
| JP | 3144315 A | 6/1991 |
| WO | 9855840 A1 | 12/1998 |
| WO | 0216883 A2 | 2/2002 |

OTHER PUBLICATIONS

European Examination Report dated Dec. 14, 2017 in European Application No. 16177459.1 (European counterpart to the instant patent application).

\* cited by examiner

METHODS AND SYSTEMS FOR DIRECT FUEL QUANTITY MEASUREMENT

BACKGROUND

This disclosure generally relates to methods and systems for measuring a quantity of liquid fuel in a fuel tank, such as a storage tank or other container. More particularly, this disclosure relates to methods and systems for measuring the quantity of liquid fuel in a fuel tank in a manner that does not require the presence of electrical components in the fuel tank.

A need to continuously measure the quantity of liquid fuel in a fuel tank exists in many commercial and military applications. For example, liquid-level sensors are commonly used in the fuel tanks of aircraft, automobiles, and trucks. Liquid-level sensors are also used to monitor liquid levels within storage tanks used for fuel dispensing.

Many transducers for measuring liquid level employ electricity. The electrical output of such transducers changes in response to a change in the liquid level being measured, and is typically in the form of a change in resistance, capacitance, current flow, magnetic field, frequency, and so on. These types of transducers may include variable capacitors or resistors, optical components, Hall Effect sensors, strain gauges, ultrasonic devices, and so on.

Currently most fuel sensors on aircraft use electricity. For example, existing electrical capacitance sensors require electrical wiring inside the tank, which in turn requires complex installations and protection measures to preclude a safety issue under certain electrical fault conditions. This electrical wiring requires careful shielding, bonding, and grounding to minimize stray capacitance and further requires periodic maintenance to ensure electrical contact integrity.

In the cases of commercial and military aviation, it is important for the flight crew to know there is adequate fuel upload for a mission prior to each flight. It is equally important for the crew to know during the flight that there is adequate fuel remaining in the tanks to complete each flight safely. A simple and accurate fuel quantity gauging system is needed. For a typical long-range transport aircraft, it takes a quarter to a half pound of fuel to transport a pound of weight. Extra fuel is dead weight and it takes fuel to transport that extra weight.

It would be advantageous if the amount of liquid fuel in a fuel tank could be measured without introducing electrical current into the fuel tank and without using optical techniques.

SUMMARY

The subject matter disclosed in detail below is directed to methods and systems for fuel quantity gauging that measure the quantity of liquid fuel in a fuel tank directly without the need to accurately locate fuel heights throughout the fuel tank using multiple fuel gauging probes. The method may comprise the following steps performed while fuel is flowing out of the fuel tank: (a) changing a volume of gas in the fuel tank (e.g., by injecting or venting gas) during a time interval; (b) measuring a rate of change of the volume of gas in the fuel tank during the time interval; (c) measuring a rate of flow of fuel out of the fuel tank during the time interval; (d) measuring a first pressure and a first temperature of the gas in the fuel tank at the start of the time interval; (e) measuring a second pressure and a second temperature of the gas in the fuel tank at the end of the time interval; and (f) calculating a quantity of fuel in the fuel tank based on the measurement data acquired in steps (c) through (f). Step (f) is performed by a processing unit. The calculation is simple and does not require the calculation of instantaneous fuel volume topography. The computing power requirement is minimal. Unlike electrical and electronic probes, no electric current in the fuel tank is required.

To meet aviation requirements, two completely independent sets of fuel gauges are required. A typical aircraft may have a multiple-point electronic system for flight and a magnetic or mechanical system available to the ground crew during fuel upload. The system proposed herein could be used as the primary or secondary system. It may also be used in conjunction with the current electronic system, making two independent in-flight capable systems available to the crew. The methodology disclosed herein is not limited to aircraft application but rather may also be used in land and marine vehicles as well as stationary liquid fuel tanks.

One aspect of the subject matter disclosed in detail below is a system for measuring a quantity of liquid fuel in a fuel tank (e.g., a fuel tank on an aircraft), comprising: a first meter that measures a rate of flow of gas through a gas line that is in fluid communication with the fuel tank; a second meter that measures a rate of flow of fuel out of the fuel tank via the fuel line; a first gauge that measures an ullage temperature in an ullage of the fuel tank; a second gauge that measures an ullage pressure in an ullage of the fuel tank; and a processing unit programmed to calculate a quantity of fuel in the fuel tank based on measurement data from the first and second meters and from the first and second gauges. The system may further comprise a fuel gauge connected to receive and display symbology representing the quantity of fuel.

In accordance with some embodiments, the processing unit is programmed to calculate a quantity of fuel in the fuel tank at a second time subsequent to a first time based in part on respective ullage temperature and pressure measurements taken by the first and second gauges at first and second times.

In accordance with other embodiments, the processing unit is programmed to: calculate a change in mass of gas in the fuel tank by integrating an output of the first meter over a time interval from a first time to a second time; calculate a change in volume of fuel in the fuel tank by integrating an output of the second meter over the time interval; and calculate a quantity of fuel in the fuel tank at the second time based on the calculated changes in mass of gas and fuel in the fuel tank during the time interval and respective ullage temperature and pressure measurements taken by the first and second gauges at the first and second times.

Another aspect of the subject matter disclosed in detail below is a method for measuring a quantity of liquid fuel in a fuel tank while fuel is flowing out of the fuel tank, comprising: (a) changing a volume of gas in the fuel tank during a time interval that starts at a first time and ends at a second time; (b) measuring a rate of change of the volume of gas in the fuel tank during the time interval; (c) measuring a rate of flow of fuel out of the fuel tank during the time interval; (d) measuring a first pressure of gas in the fuel tank at the first time; (e) measuring a first temperature of gas in the fuel tank at the first time; (f) measuring a second pressure of gas in the fuel tank at the second time; (g) measuring a second temperature of gas in the fuel tank at the second time; and (h) calculating a quantity of fuel in the fuel tank based on measurement data acquired in steps (b) through (g), wherein step (h) is performed by a processing unit. The method may further comprise closing a vent in fluid communication with the ullage prior to step (a), wherein step (a) comprises injecting gas into the fuel tank via a gas line during the time interval while the vent is closed, and step (b) comprises measuring a rate of flow of gas into the fuel tank via the gas line. In the alternative, the method may further comprise opening a vent in fluid communication with the ullage prior to step (a), wherein step (a) comprises venting gas out of the fuel tank via the open vent during the time interval, and step (b) comprises measuring a rate of flow of gas out of the fuel tank via the open vent. The method may further comprise displaying symbology representing the quantity of fuel. In one implementation, steps (a) through (h) are performed onboard an aircraft.

A further aspect is a method for measuring a quantity of liquid fuel in a fuel tank onboard an aircraft during flight, comprising: (a) changing a volume of gas in the fuel tank during a time interval that starts at a first time and ends at a second time; (b) measuring a rate of change of the volume of gas in the fuel tank during the time interval; (c) measuring a rate of flow of fuel out of the fuel tank during the time interval; (d) measuring a first pressure and a first temperature of gas in the fuel tank at the first time; (e) measuring a second pressure and second temperature of gas in the fuel tank at the second time; (f) calculating a change in mass of gas in the fuel tank during the time interval; (g) calculating a change in volume of fuel in the fuel tank during the time interval; (h) calculating the quantity of fuel in the fuel tank at the second time based on the calculated changes in mass of gas and volume of fuel in the fuel tank during the time interval, the first and second temperatures, and the first and second pressures; and (i) displaying symbology representing the quantity of fuel, wherein steps (f) through (h) are performed by a processing unit.

Other aspects of methods and systems for measuring the quantity of fuel in a fuel tank are disclosed below.

BRIEF DESCRIPTION OF THE DRAWINGS

Reference will hereinafter be made to the drawings in which similar elements in different drawings bear the same reference numerals.

DETAILED DESCRIPTION

Various embodiments of methods and systems for measurement of the quantity (i.e., volume or mass) of liquid fuel in a fuel tank on an aircraft will now be described in detail for the purpose of illustration. It should be appreciated, however, that the methodology disclosed herein is not limited to aircraft applications but rather may also be used in land and marine vehicles as well as stationary liquid fuel tanks. At least some of the details disclosed below relate to optional features or aspects, which in some applications may be omitted without departing from the scope of the claims appended hereto.

Fuel tanks in vehicles carry fuel that is used to operate the engines of a vehicle. The fuel is flammable in the presence of oxygen or air. When fuel is used, the level of fuel decreases. This decrease in the level of fuel results in a space filled with gas increasing in size above the level of the liquid fuel in the fuel tank. The space above the liquid fuel may contain air and fuel vapors. This space is referred to as an "ullage".

Increased safety for fuel tanks may be provided through the use of an inert gas system. The inert gas system may generate and distribute an inert gas to reduce the oxygen content that may be present in the fuel tanks. In particular, the space (i.e., ullage) above the surface of the fuel in the fuel tank is filled with an inert gas. The inert gas displaces air that contains oxygen in the fuel tank. The inert gas may also displace fuel vapors and other elements. This process is called "inerting". The inert gas reduces the oxygen content in this space in a manner that reduces a possibility of a combustion event, including ignition, detonation, or deflagration. The combustion event may be the combustion of the fuel, fuel vapor, or both.

An on-board inert gas generation system (OBIGGS) may be used to generate oxygen-depleted (i.e., inert) gas to inert the ullage in fuel tanks. Inerting the ullage portion of the fuel tank reduces the oxidizing agents in the fuel tank and therefore reduces the flammability of the vapor therein. This inert gas may be, for example, nitrogen, nitrogen-enriched air, carbon dioxide, and other types of inert gases.

Figure 1:
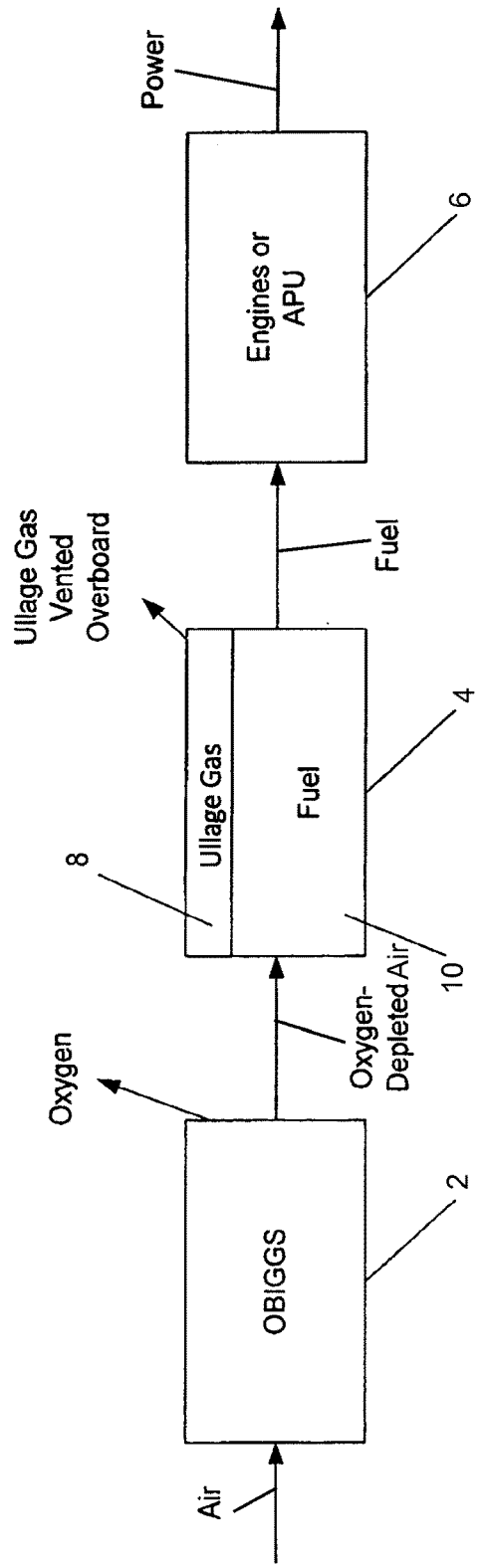
FIG. 1 is a block diagram showing major components of a system onboard an aircraft for converting liquid fuel into power.

FIG. 1 is a block diagram showing major components of a system onboard an aircraft for converting liquid fuel into power and inerting the fuel tank. The system comprises an on-board inert gas generation system (OBIGGS) 2. Air is delivered to the OBIGGS 2. The OBIGGS 2 is in fluid communication with a fuel tank 4. Oxygen is separated from air in the OBIGGS 2 and the remaining oxygen-depleted air is sent to the fuel tank 4. The interior volume of the fuel tank 4 contains ullage gas 8 overlying liquid fuel 10. The typical OBIGGS 2 separates oxygen and nitrogen, the two main components of air. The oxygen is not used and nitrogen-enriched air is pumped into the fuel tank 4 to reduce the oxygen concentration of the ullage gas 8. In some embodiments, the OBIGGS 2 produces nitrogen-enriched air from engine bleed air (i.e., pressurized air that is bled from different engine compressor stages for pneumatic system consumers on the aircraft). The ullage gas 8 can be vented overboard from the fuel tank 4. Fuel from the fuel tank 4 is delivered to the engines or to an auxiliary power unit (APU) 6, thereby enabling the generation of power as the fuel is combusted. The OBIGGS 2 is normally turned on after fuel upload prior to each flight. For military aircraft, the system is typically on. On commercial flights, the system may be turned off in flight.

Gas (including ullage gas in a fuel tank) is compressible, which means that when a given mass of gas is pressurized, its volume decreases, i.e., more mass can be compressed into the same volume under increasing pressure. Both air and nitrogen-enriched air are compressible and are ideal gases. Ideal gas behaviors are governed by the ideal gas law:

$$PV=MRT$$

where P is pressure, V is volume, M is amount (e.g., mass), R is the ideal gas constant, and T is temperature. In SI units, P is measured in pascals, V is measured in cubic meters, M is measured in moles, and T is measured in degrees Kelvin. R has the value 8.314 $J \cdot K^{-1} \cdot mol^{-1}$ or 0.08206 $L \cdot atm \cdot mol^{-1} \cdot K^{-1}$ if using pressure in standard atmospheres (atm) instead of pascals, and volume in liters instead of cubic meters.

In contrast to the compressibility of gas, liquid is incompressible, which means that when a liquid is pressurized, its volume does not change. Liquid fuel is incompressible.

In various embodiments, the aircraft includes two major types of fuel metering systems: an engine fuel flow meter and a fuel tank fuel quantity gauge. The engine fuel flow meter is on the fuel line in the engine. It gives a very accurate instantaneous fuel flow reading of fuel supplied to each engine. Summing the readings from all the fuel flow meters and integrating over flight time gives the crew total fuel consumed in flight. The problem with this system alone is that only the quantity of fuel going into the engine is known. The fuel flow meters do not provide how much fuel is in each fuel tank.

There are at least five types of fuel tank fuel quantity gauges used in aviation: (1) sight glass, (2) mechanical, (3) electrical; (4) electronic, and (5) optical. Because of fuel tank complexity, flight condition variation, and the attitude of the aircraft is not constant, multiple location readings in the tank are needed for accuracy. A typical small commercial aircraft may require a minimum of twenty fuel gauging probes and a large aircraft may have over sixty. Total system weight is high and failure of any one probe compromises accuracy. To convert the instantaneous probe data and flight data to fuel quantity, a sophisticated algorithm is required. The algorithm requires much computing power. When there is a design change such as plumbing re-routing in the fuel tank, fuel quantity software update is required. In addition to fuel gauging probes, the aircraft may require a probe compensator to compensate for variation in fuel permittivity, a densitometer to measure fuel density, and a temperature sensor to measure fuel temperature. In flights where most time is spent in level cruise, the fuel and ullage interface line is relatively calm and level. Under these conditions, level sensing gauges provide accurate data. In flights where an aircraft is maneuvered constantly, these gauges may not provide desirable results.

The fuel gauging system proposed herein overcomes many of the shortcomings described in the preceding paragraphs. For each fuel tank, the fuel gauging system comprises an incoming gas line, a vent line with a valve, an ullage gas pressure gauge, and an ullage gas temperature gauge. A pressure measurement and a temperature measurement are taken during each fuel quantity reading.

Figure 2:
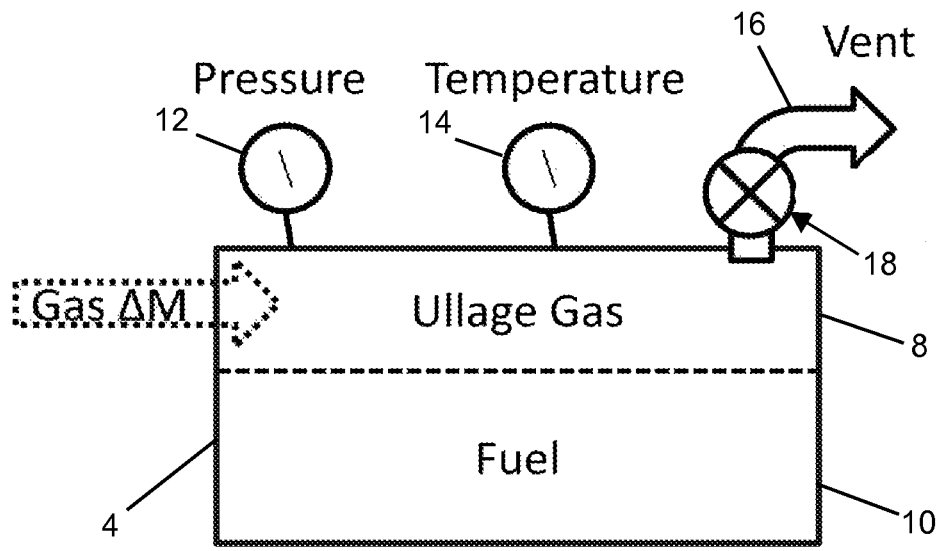
FIG. 2 is a block diagram showing a fuel tank containing liquid fuel and ullage gas and gauges for measuring pressure and temperature of the ullage gas at the start of gas injection (indicated by the dashed arrow labeled "Gas ΔM").

FIG. 2 is a block diagram showing a fuel tank 4 containing liquid fuel 10 and ullage gas 8, a pressure gauge 12 for measuring the pressure of the ullage gas inside the fuel tank 4, and a temperature gauge 14 for measuring the temperature of the ullage gas inside the fuel tank 4. The system shown in FIG. 2 also comprises one or more injection nozzles (not shown) for injecting nitrogen-enriched air (indicated by the dashed arrow labeled "Gas ΔM") into the fuel tank 4 via an incoming gas line (not shown), a vent line 16 for fuel tank venting (pressure equalization) and discharging ullage gas, and a climb/dive valve 18 on the vent line 16 to control venting. With the valve 18 on the vent line 16 closed, a small amount (i.e., mass) of gas, indicated by ΔM in FIG. 2, is injected into the fuel tank 4. The amount ΔM is limited by the fuel tank overpressure design limit. The readings on the pressure and temperature gauges 12, 14 seen in FIG. 2 are intended to indicate the ullage pressure and temperature at the start (also referred to below as "Time 1") of a time interval (which time interval ends at Time 2, where Time 2−Time 1=ΔT). The dashed arrow labeled "Gas ΔM" in FIG. 2 indicates gas injection occurring at Time 1. The gas injection continues until at least Time 2.

Figure 3:
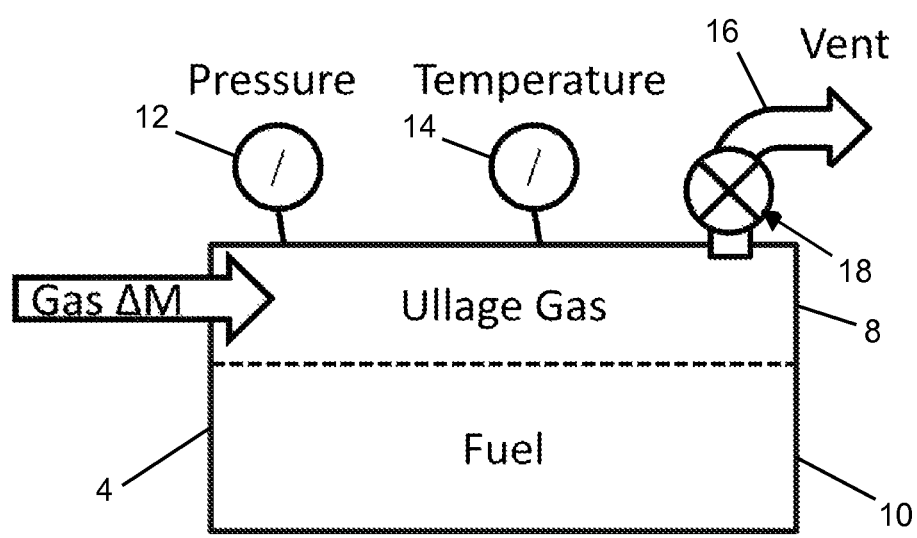
FIG. 3 is a block diagram showing the same components as are depicted in FIG. 2 after the injection of an amount of gas equal to ΔM (indicated by the solid arrow labeled "Gas ΔM").

FIG. 3 is a block diagram showing the same components as depicted in FIG. 2 after the injection of an amount of gas equal to ΔM (indicated by the solid arrow labeled "Gas ΔM") during the time interval from Time 1 to Time 2. In other words, ΔM represents the change in mass of the ullage gas during ΔT. As will be described in more detail later, ΔM can be computed by integrating the rate at which gas is flowing into the fuel tank 4 over the time interval from Time 1 to Time 2.

Although not indicated in FIGS. 2 and 3, liquid fuel 10 is also flowing out of the fuel tank 4 as gas is being injected into the fuel tank 4. As will be described in more detail later, a decrease in fuel volume ΔV can be computed by integrating the rate at which fuel is flowing out of the fuel tank 4 over the time interval from Time 1 to Time 2.

As gas is injected into and fuel 10 flows out of the fuel tank 4, the pressure and temperature of the ullage gas 8 changes, as indicated by the readings on pressure and temperatures gauges 12, 14 seen in FIG. 3 as compared to the respective readings on the same gauges seen in FIG. 2.

In accordance with one methodology, a first pressure measurement and a first temperature measurement are taken at Time 1, as indicated by the readings of pressure gauge 12 and temperature gauge 14 shown in FIG. 2. A second pressure measurement and a second temperature measurement are taken at Time 2, as indicated by the readings of pressure gauge 12 and temperature gauge 14 shown in FIG. 3. As gas is added to the ullage 8 during the time interval from Time 1 to Time 2 (while the valve 18 of the vent line 16 is closed), since gas is compressible and the ullage is constrained, the measured ullage pressure and ullage temperature should both increase. Conversely, the fuel is incompressible. Therefore, although the ullage pressure increases as gas is injected, the fuel volume does not change due to this increase in ullage pressure (although it does change due to the flow of fuel to the engine).

In cases where OBIGGS is not available or for aircraft without an OBIGGS, engine bleed air can be used as the injected gas. Engine bleed air can be hot, so pre-cooling may be required. In the case of gas injection, the gas flow rate can be measured by a gas flow meter located along the incoming gas line. By integrating gas flow rate between Time 1 and Time 2, the gas mass change ΔM is obtained. The fuel flow rate (gpm or lb/hr) to the engine is measured at the engine and is a known quantity during flight. By integrating fuel flow rate between Time 1 and Time 2, the fuel volume change ΔV is obtained. This change in fuel volume will be equal and opposite to the change in ullage volume during the time interval since the volume of the fuel tank is constant.

Another source of pressurized air comes from cabin air. For commercial aircraft, the air in the cabin is changed constantly. The air is dumped overboard. For long-range aircraft, this air may be used to pressurize the ullage. The pressure in an aircraft cabin is typically set at 8,000 ft pressure altitude or eleven pounds per square inch. The ambient air pressure at a cruise altitude of 35,000 ft is 3.5 pounds per square inch. There is ample air pressure in the cabin air to run the fuel gauging system. In addition, the cabin air is a wasted air; therefore it does not cost fuel for pressurization.

The ideal gas law is then used to calculate the ullage volume $(V+\Delta V)$ at Time 2. The two gas laws at Times 1 and 2 are as follows:

$$P_1 V = MRT_1$$

$$P_2(V+\Delta V) = (M+\Delta M)RT_2$$

The pressure $P_1$ and temperature $T_1$ are measured at Time 1 (at or after the start of gas injection); the pressure $P_2$ and temperature $T_2$ are measured at Time 2 (while gas injection continues); and $\Delta M$ is measured over the time interval (from Time 1 to Time 2) during which gas is being injected. R is the ideal gas constant. The initial ullage volume V and initial gas mass M in the fuel tank 4 at Time 1 are the only two unknowns. The respective equations for thermodynamic states at Times 1 and 2 are solved simultaneously for ullage volume V at Time 1 and ullage gas mass M at Time 1. The ullage volume calculated in each instance is the true ullage volume regardless of the shape of the ullage or how many gas bubbles make up the ullage volume.

The difference between the interior volume of the fuel tank and the ullage volume $(V+\Delta V)$ at Time 2 is the fuel volume at Time 2. Similarly, the fuel volume at a Time 3 (subsequent to Time 2) can be computed by using either the ideal gas laws for Times 2 and 3 or for Times 1 and 3. In each instance, the product of the fuel volume and the fuel density is the fuel weight.

The measurement and calculation processes continue until the ullage gas pressure reaches a pre-specified limit. The limiting ullage pressure is always below the fuel tank overpressure design limit. When the limiting ullage pressure is reached, the valve 18 is opened to allow the ullage to depressurize. During depressurization, the ullage gas pressure and temperature measurements continue. The only difference is that the change in the mass of ullage gas $\Delta M$ is now negative.

Figure 4:
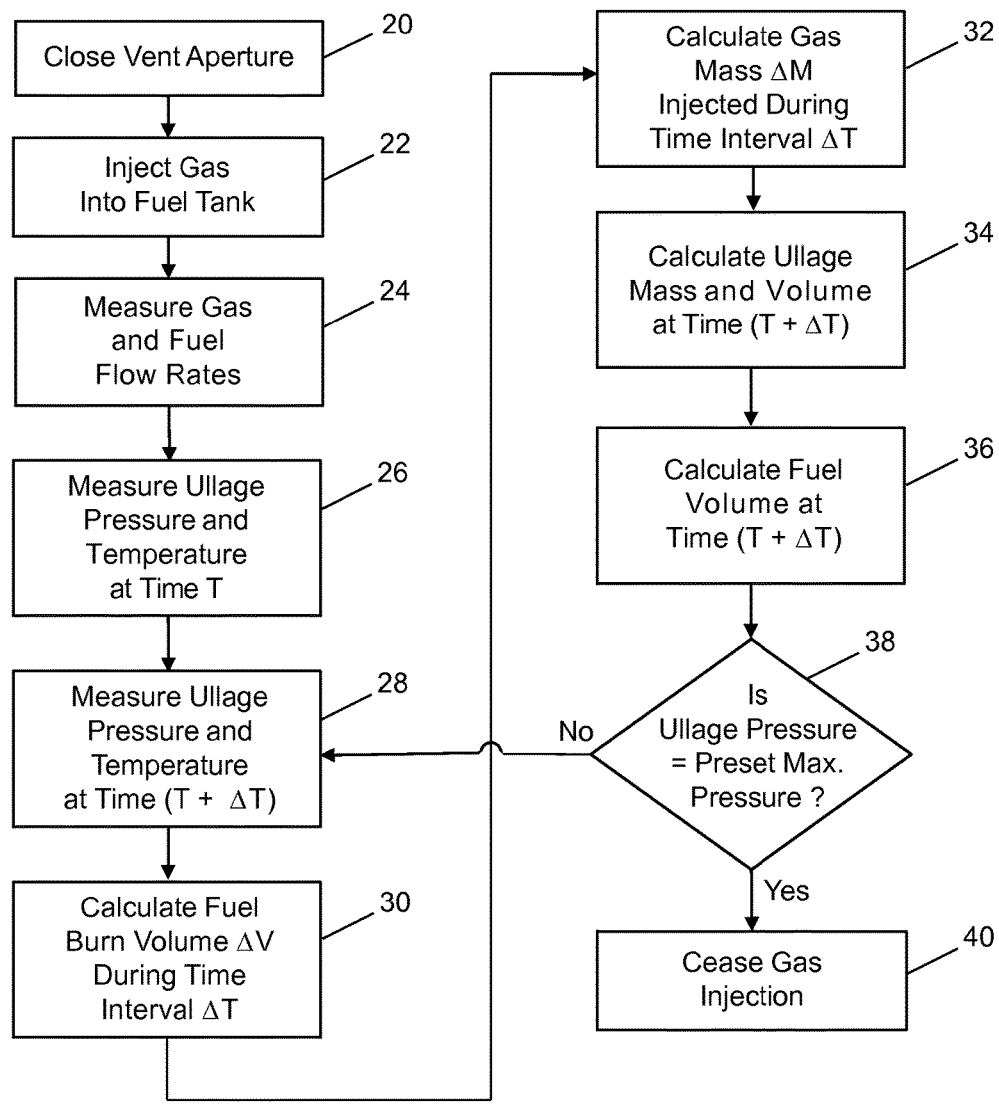
FIG. 4 is a flowchart showing steps of a method for direct measurement of the quantity of liquid fuel in a fuel tank while gas is being injected into the fuel tank in accordance with one embodiment.

FIG. 4 is a flowchart showing steps of a method for direct measurement of the quantity of liquid fuel in a fuel tank while gas is being injected into and fuel is flowing out of the fuel tank in accordance with one embodiment. First, the vent valve is closed (step 20). Then gas is injected into the fuel tank via a gas line during a time interval that starts at time T and ends at Time $(T+\Delta T)$ while the vent valve is closed (step 22). The rates at which gas is flowing into and fuel is flowing out of the fuel tank are measured throughout the time interval (step 24). In addition, the pressure and temperature of the gas in the fuel tank are measured at time T (step 26) and at time Time $(T+\Delta T)$ (step 28). A change in volume of fuel in the fuel tank during the time interval $\Delta T$ is then calculated (step 30). Likewise a change in mass of gas injected into the fuel tank during the time interval $\Delta T$ is calculated (step 32). The ullage gas mass M and ullage gas volume V at Time T are then calculated using the respective gas law equations for Times T and $(T+\Delta T)$ as previously described (step 34). The fuel volume at Time $(T+\Delta T)$ can then be calculated (step 36). At the same time, a determination is made whether the ullage gas pressure has reached the preset maximum pressure or not (step 38). If the preset maximum pressure has been reached, then gas injection is stopped (step 40). If the preset maximum pressure has not been reached, then gas injection continues and the process returns to step 28, i.e., the pressure and temperature of the gas in the fuel tank are measured again after the passage of a second time interval that starts at Time $(T+\Delta T)$ and ends at $(T+2\Delta T)$. Successive datapoints can be acquired at regular time increments $\Delta T$, i.e., at successive times $(T+n\Delta T)$, where $n=1, 2, 3$, etc.

Figure 5:
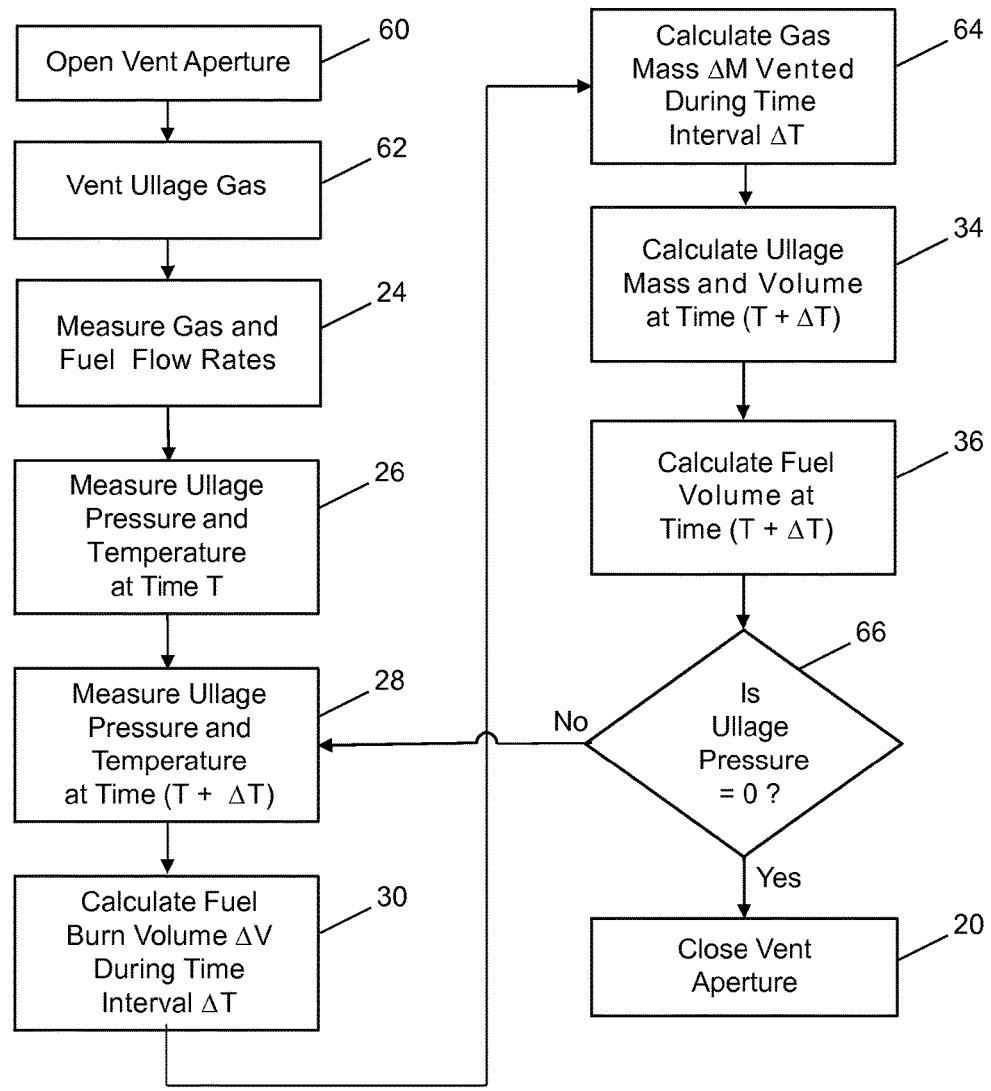
FIG. 5 is a flowchart showing steps of a method for direct measurement of the quantity of liquid fuel in a fuel tank while gas is being vented out of the fuel tank in accordance with another embodiment.

FIG. 5 is a flowchart showing steps of a method for direct measurement of the quantity of liquid fuel in a fuel tank while gas is being vented and fuel is flowing out of the fuel tank in accordance with another embodiment. First, the vent valve is opened (step 60). Then ullage gas is vented out of the fuel tank via a vent line (e.g., using a gas pump) during a time interval that starts at time T and ends at Time $(T+\Delta T)$ while the vent valve is open (step 62). The rates at which gas and fuel are flowing out of the fuel tank are measured throughout the time interval (step 24). In addition, the pressure and temperature of the gas in the fuel tank are measured at time T (step 26) and at time Time $(T+\Delta T)$ (step 28). A change in volume of fuel in the fuel tank during the time interval is then calculated (step 30). Likewise a change in mass of gas being vented out of the fuel tank during the time interval is calculated (step 64). The ullage gas mass M and ullage gas volume V at Time T are then calculated using the respective gas law equations for Times T and $(T+\Delta T)$ as previously described (step 34). The fuel volume at Time $(T+\Delta T)$ can then be calculated (step 36). At the same time, a determination is made whether the ullage gas pressure has reached zero (relative to ambient pressure) or not (step 66). If the ullage gas pressure has reached zero, the vent valve is closed (step 20). If the ullage gas pressure has not reached zero, then the venting of gas continues and the process returns to step 28, i.e., the pressure and temperature of the gas in the fuel tank are measured again after the passage of a second time interval as previously described.

Figure 6:
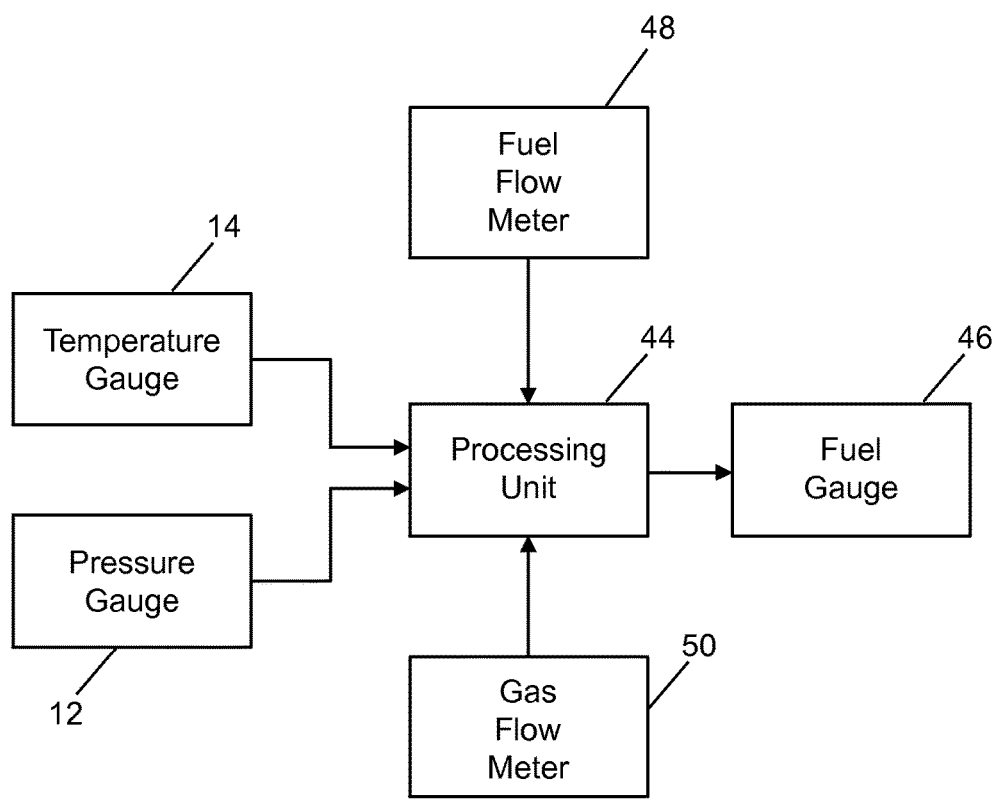
FIG. 6 is a block diagram identifying components of a system for measuring a level of liquid fuel in a fuel tank in accordance with some embodiments.

FIG. 6 is a block diagram identifying components of a system for measuring a level of liquid fuel in a fuel tank in accordance with the embodiments described above. All calculations are performed by a processing unit 44 which receives measurement data from the pressure gauge 12, the temperature gauge 14, a fuel flow meter 48 and a gas flow meter 50. The processing unit 44 is programmed to execute algorithms for quantifying the amount of fuel in a fuel tank. The processing unit 44 outputs the fuel quantity data to a fuel gauge 46, which displays symbology representing the quantity of fuel. The fuel gauge 46 may take the form of a display device having a display processor programmed to display the measurement results (e.g., the fuel level) graphically and/or alphanumerically on a display screen. The readings provided by the processing unit 44 to the fuel gauge 46 may be integrated or averaged before presentation and may be provided in real time substantially continuously or at different time intervals.

The processing unit 44 may be a dedicated microprocessor or a general-purpose computer. In accordance with one embodiment, the algorithms executed by the processing unit 44 include: (1) an algorithm for computing a change in volume $\Delta V$ of fuel in the fuel tank during a time interval by integrating a rate of flow of fuel out of the fuel tank (provided by a fuel flow meter 48) during the time interval; (2) an algorithm for computing a change in mass $\Delta M$ of gas in the fuel tank during the time interval by integrating a rate of flow of gas into or out of the fuel tank (provided by a gas flow meter 50) during the time interval; (3) an algorithm for computing the ullage gas mass M and ullage gas volume V at the start of the time interval based on $\Delta V$, $\Delta M$, pressure measurements taken at the start and end of the time interval by the pressure gauge 12, and temperature measurements taken at the start and end of the time interval by the temperature gauge 14; and (4) an algorithm for calculating the fuel volume at the end of the time interval based on $(V+\Delta V)$ and the fixed volume of the fuel tank. The fuel weight can be computed as the product of the fuel volume and the fuel density.

One advantage of the system described above is that it measures the ullage, not the fuel level (i.e., fuel surface location). Neither the attitude of the aircraft nor the flight condition affect the reading or accuracy of the measurement.

Most aircraft have multiple fuel tanks. Similar to the current fuel system practice, each fuel tank can be provided with its own individual fuel quantity gauging system. For fuel tanks with multiple partitions, more than one temperature probe may be required.

Ullage gases are not limited to OBIGGS nitrogen-enriched air or engine bleed air. Other gases or inert gas such as carbon dioxide can be used. For non-aircraft and stationary tank applications, pressurized air or bottled gas can be used.

Furthermore, ullage gas is not limited to ideal gas. Any gas can be used. For example, when a Van Der Waals gas is used, the Van Der Waals equation and the corresponding Van Der Waals constants for the gas can be used.

Mixing two different gases, i.e., the gas added is different from what is in the fuel tank, works but it may make the final calculation more tedious.

All aircraft systems are required to have backup system for redundancy. This fuel gauging system is lightweight and inexpensive. Redundancy can be achieved by duplicating the entire system in the fuel tanks as long as they are independent of each other.

While methods for measuring the quantity of liquid fuel in a fuel tank have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

In addition, the method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A system for measuring a quantity of liquid fuel in a fuel tank, comprising:
 a first meter that measures a rate of flow of gas through a gas line that is in fluid communication with the fuel tank;
 a second meter that measures a rate of flow of fuel out of the fuel tank via a fuel line;
 a first gauge that measures an ullage temperature in an ullage of the fuel tank;
 a second gauge that measures an ullage pressure in the ullage of the fuel tank; and
 a processing unit programmed to calculate a quantity of fuel in the fuel tank based on measurement data from said first and second meters and from said first and second gauges.

2. The system as recited in claim 1, further comprising a fuel gauge connected to receive and display symbology representing said quantity of fuel.

3. The system as recited in claim 1, wherein said processing unit is programmed to calculate a quantity of fuel in the fuel tank at a second time subsequent to a first time based in part on respective ullage temperature and pressure measurements taken by said first and second gauges at said first and second times.

4. The system as recited in claim 1, wherein said processing unit is programmed to:
 calculate a change in mass of gas in the fuel tank by integrating an output of said first meter over a time interval from a first time to a second time;
 calculate a change in volume of fuel in the fuel tank by integrating an output of said second meter over said time interval; and
 calculate a quantity of fuel in the fuel tank at said second time based on the calculated changes in mass of gas and fuel in the fuel tank during said time interval and respective ullage temperature and pressure measurements taken by said first and second gauges at said first and second times.

5. The system as recited in claim 1, wherein said processing unit is further programmed to cause said gas line to be closed in response to an ullage pressure that equals a preset maximum pressure.

6. The system as recited in claim 1, wherein said gas line is connected to an on-board inert gas generation system.

7. The system as recited in claim 1, wherein said gas line receives engine bleed air.

8. The system as recited in claim 1, wherein said gas line is a vent.

9. The system as recited in claim 1, wherein the fuel tank is part of an aircraft.

10. A method for measuring a quantity of liquid fuel in a fuel tank while fuel is flowing out of the fuel tank, comprising:
 (a) changing a volume of gas in an ullage above the liquid fuel in the fuel tank during a time interval that starts at a first time and ends at a second time;
 (b) measuring a rate of change of the volume of gas in the fuel tank during said time interval;
 (c) measuring a rate of flow of fuel out of the fuel tank during said time interval;
 (d) measuring a first pressure of gas in the fuel tank at said first time;
 (e) measuring a first temperature of gas in the fuel tank at said first time;
 (f) measuring a second pressure of gas in the fuel tank at said second time;
 (g) measuring a second temperature of gas in the fuel tank at said second time; and
 (h) calculating a quantity of fuel in the fuel tank based on measurement data acquired in steps (b) through (g),
 wherein step (h) is performed by a processing unit.

11. The method as recited in claim 10, further comprising closing a vent in fluid communication with the ullage prior to step (a), wherein step (a) comprises injecting gas into the fuel tank via a gas line during said time interval while the vent is closed, and step (b) comprises measuring a rate of flow of gas into the fuel tank via the gas line.

12. The method as recited in claim 11, further comprising closing the gas line in response to an ullage pressure that equals a preset maximum pressure.

13. The method as recited in claim 10, further comprising opening a vent in fluid communication with the ullage prior to step (a), wherein step (a) comprises venting gas out of the ullage via the open vent during said time interval, and step (b) comprises measuring a rate of flow of gas out of the ullage via the open vent.

14. The method as recited in claim 13, further comprising closing said vent in response to an ullage pressure that equals zero.

15. The method as recited in claim 10, further comprising displaying symbology representing said quantity of fuel.

16. The method as recited in claim 10, wherein step (h) comprises:
   calculating a change in mass of gas in the fuel tank during said time interval;
   calculating a change in volume of fuel in the fuel tank during said time interval; and
   calculating the quantity of fuel in the fuel tank at said second time based on the calculated changes in mass of gas and fuel in the fuel tank during said time interval and said first and second temperatures and said first and second pressures.

17. The method as recited in claim 10, wherein said injected gas is nitrogen-enriched air.

18. The method as recited in claim 10, wherein said injected gas is engine bleed air.

19. The method as recited in claim 10, wherein steps (a) through (h) are performed onboard an aircraft.

20. A method for measuring a quantity of liquid fuel in a fuel tank onboard an aircraft during flight, comprising:
   (a) changing a volume of gas in an ullage above the liquid fuel in the fuel tank during a time interval that starts at a first time and ends at a second time;
   (b) measuring a rate of change of the volume of gas in the fuel tank during said time interval;
   (c) measuring a rate of flow of fuel out of the fuel tank during said time interval;
   (d) measuring a first pressure and a first temperature of gas in the fuel tank at said first time;
   (e) measuring a second pressure and second temperature of gas in the fuel tank at said second time;
   (f) calculating a change in mass of gas in the fuel tank during said time interval;
   (g) calculating a change in volume of fuel in the fuel tank during said time interval;
   (h) calculating the quantity of fuel in the fuel tank at said second time based on the calculated changes in mass of gas and volume of fuel in the fuel tank during said time interval, said first and second temperatures, and said first and second pressures; and
   (i) displaying symbology representing said quantity of fuel,
   wherein steps (f) through (h) are performed by a processing unit.

21. The system as recited in claim 3, wherein said processing unit is programmed to calculate a quantity of fuel in the fuel tank using an equation representing an ideal gas law when the gas is an ideal gas or using a Van Der Waals equation when the gas is a Van Der Waals gas.

22. The system as recited in claim 10, wherein during operation (h) said processing unit uses an equation representing an ideal gas law when the gas is an ideal gas or uses a Van Der Waals equation when the gas is a Van Der Waals.

23. The system as recited in claim 20, wherein during operation (h) said processing unit uses an equation representing an ideal gas law when the gas is an ideal gas or uses a Van Der Waals equation when the gas is a Van Der Waals.

* * * * *